United States Patent
Sueyoshi et al.

(10) Patent No.: US 6,904,089 B1
(45) Date of Patent: Jun. 7, 2005

(54) ENCODING DEVICE AND DECODING DEVICE

(75) Inventors: Masahiro Sueyoshi, Osaka (JP); Masaharu Matsumoto, Osaka (JP); Kazutaka Abe, Osaka (JP); Kousuke Nishio, Osaka (JP); Takashi Katayama, Osaka (JP); Akihisa Kawamura, Osaka (JP); Shuji Miyasaka, Osaka (JP); Takeshi Fujita, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/472,401

(22) Filed: Dec. 27, 1999

(30) Foreign Application Priority Data

Dec. 28, 1998 (JP) .......................................... 10-374272
Apr. 22, 1999 (JP) .......................................... 11-115554

(51) Int. Cl.$^7$ .............................................. H04B 1/66
(52) U.S. Cl. ............. 375/240; 375/240.25; 375/240.26; 348/423.1; 704/229; 704/500; 704/503
(58) Field of Search .......................... 375/240, 240.25, 375/240.26, 240.01, 240.23, 240.28; 348/423.1, 584, 423, 390; 704/229, 500, 503; 369/59; 386/96, 98

(56) References Cited

U.S. PATENT DOCUMENTS

| 5,511,054 | A | * | 4/1996 | Oishi et al. .................... 369/59 |
| 5,543,853 | A | * | 8/1996 | Haskell et al. ......... 375/240.28 |
| 5,617,145 | A | * | 4/1997 | Huang et al. ............. 348/423.1 |
| 5,793,431 | A | * | 8/1998 | Blanchard .............. 375/240.01 |

* cited by examiner

*Primary Examiner*—Shawn S. An

(74) *Attorney, Agent, or Firm*—Renner, Otto, Boisselle & Sklar, LLP

(57) ABSTRACT

An encoding device includes an encoding section for generating hit streams having a variable frame length from an input audio signal, a maximum frame length of the bit streams being fixed; a storage section for storing the bit streams generated by the encoding section; and a transfer section for transferring the bit streams at a prescribed transfer rate. The storage section includes a buffer having a capacity corresponding to at least a value which is obtained by subtracting an amount of the bit streams transferable in one frame time period at a minimum possible transfer rate from a value of twice the maximum frame length.

3 Claims, 12 Drawing Sheets

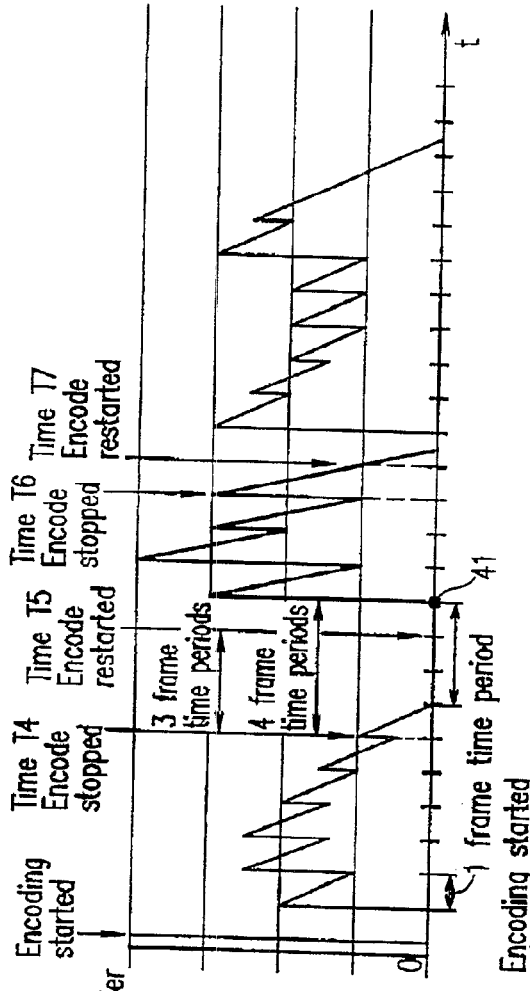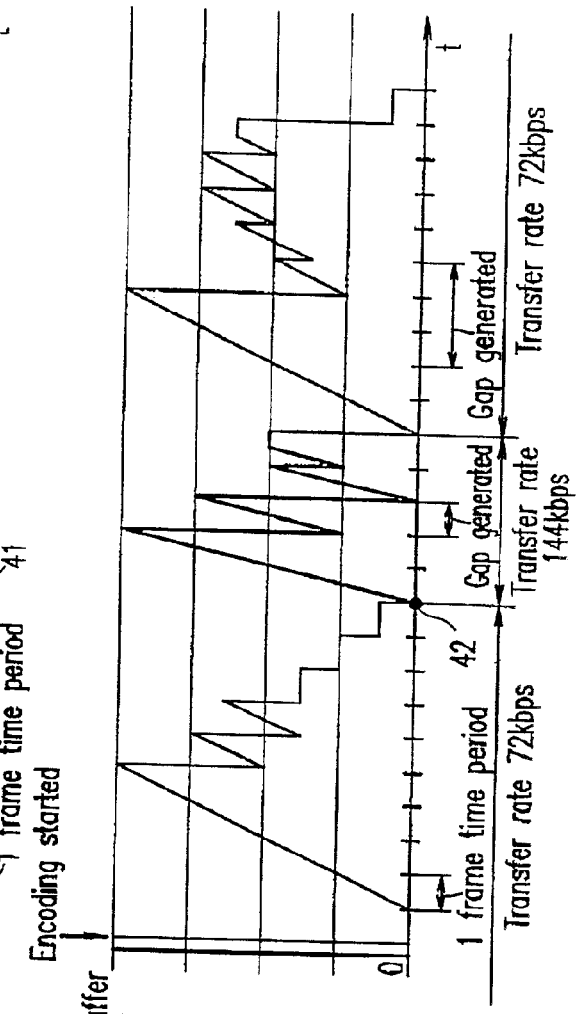

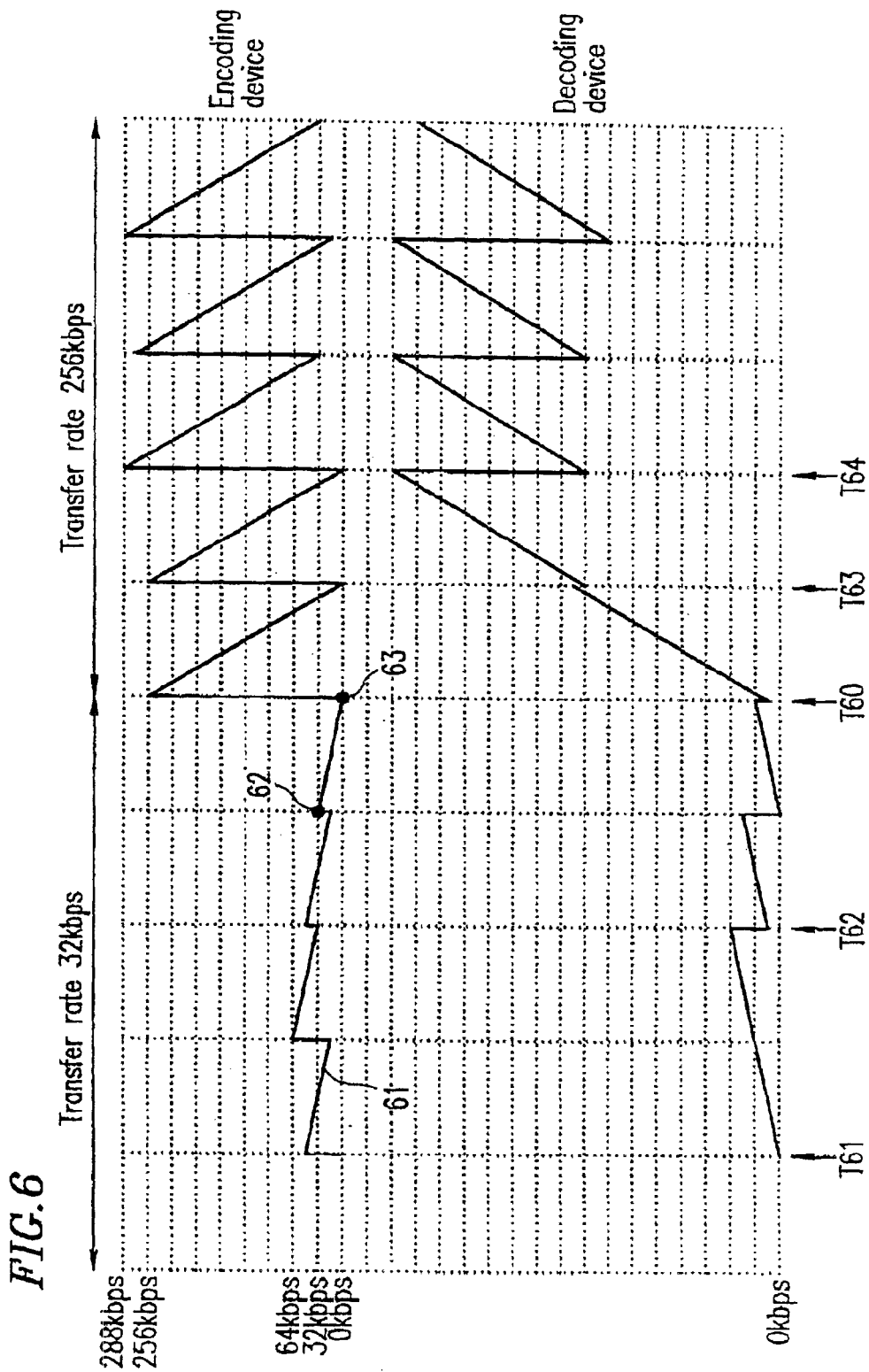

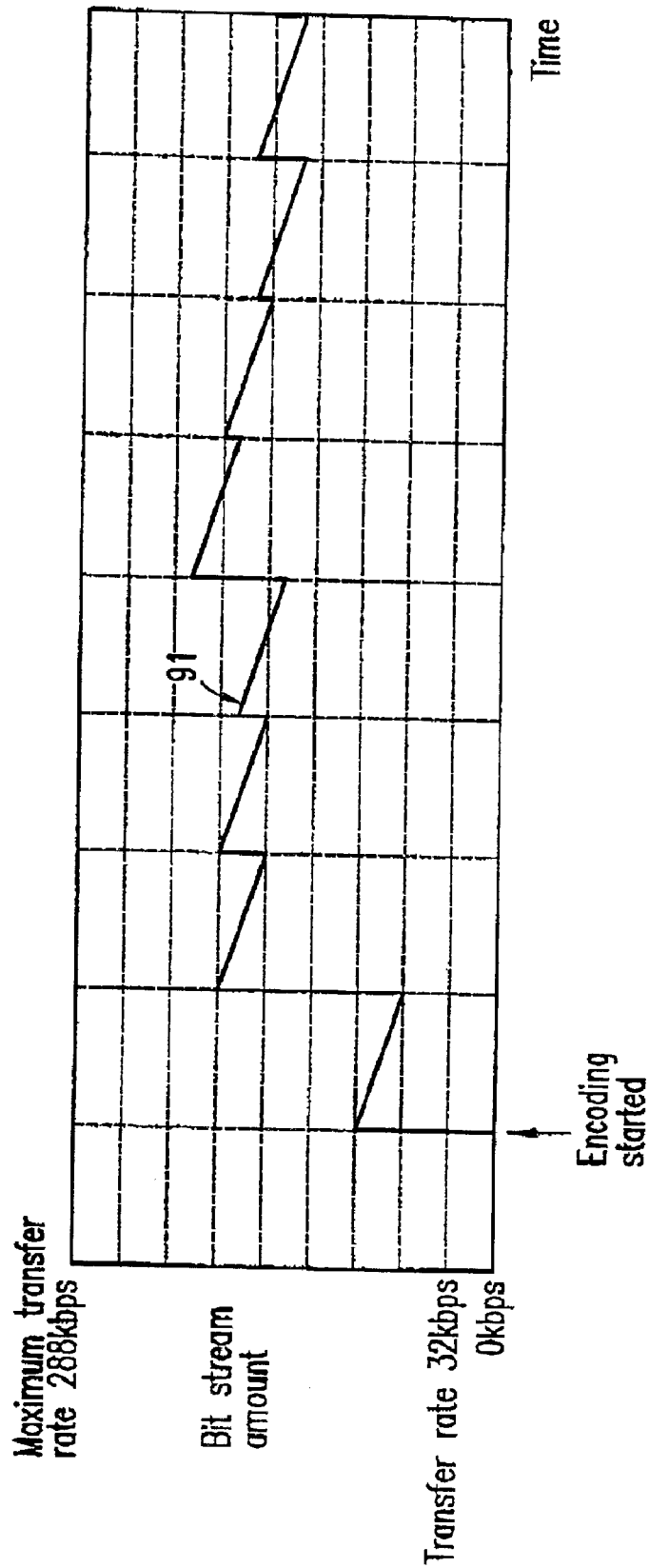

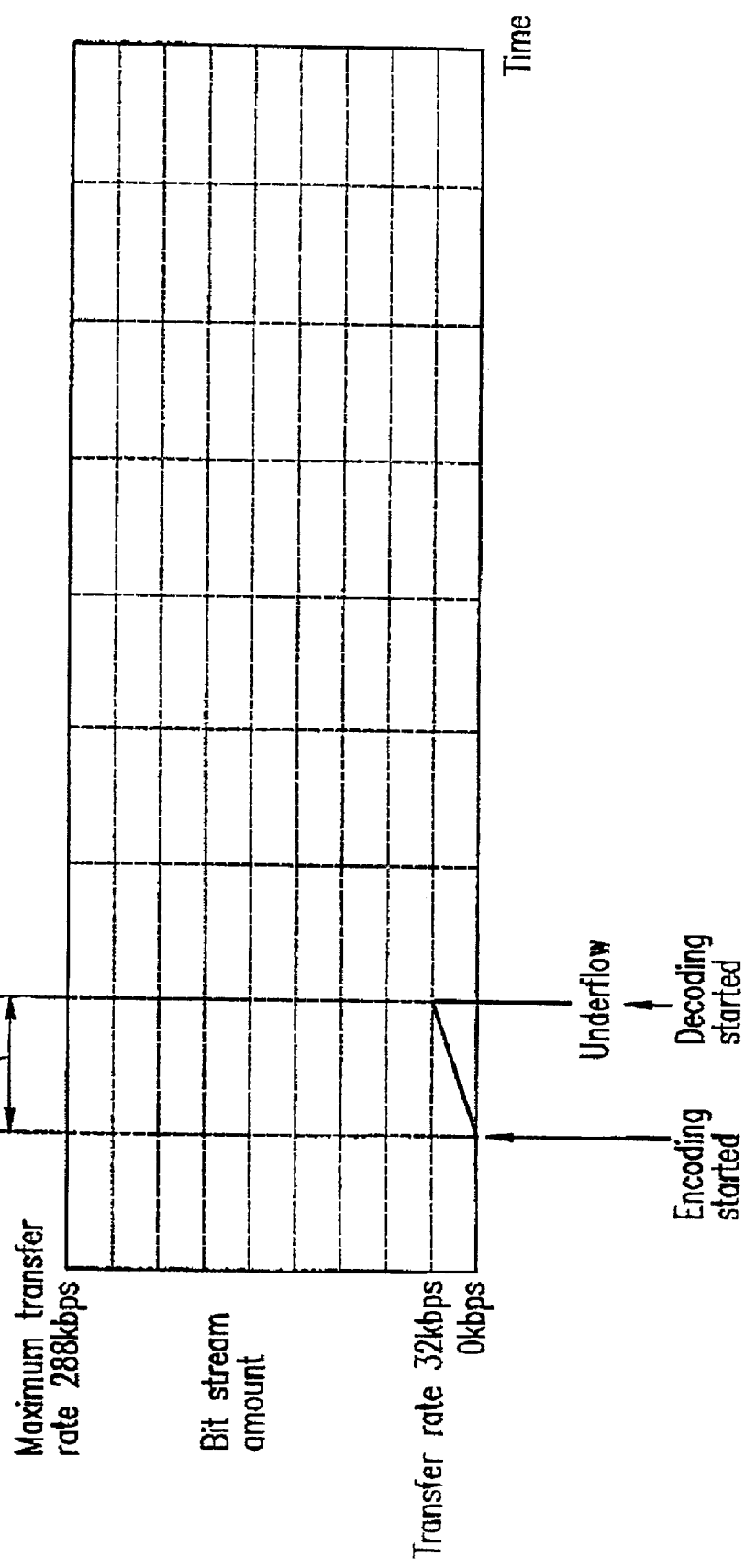

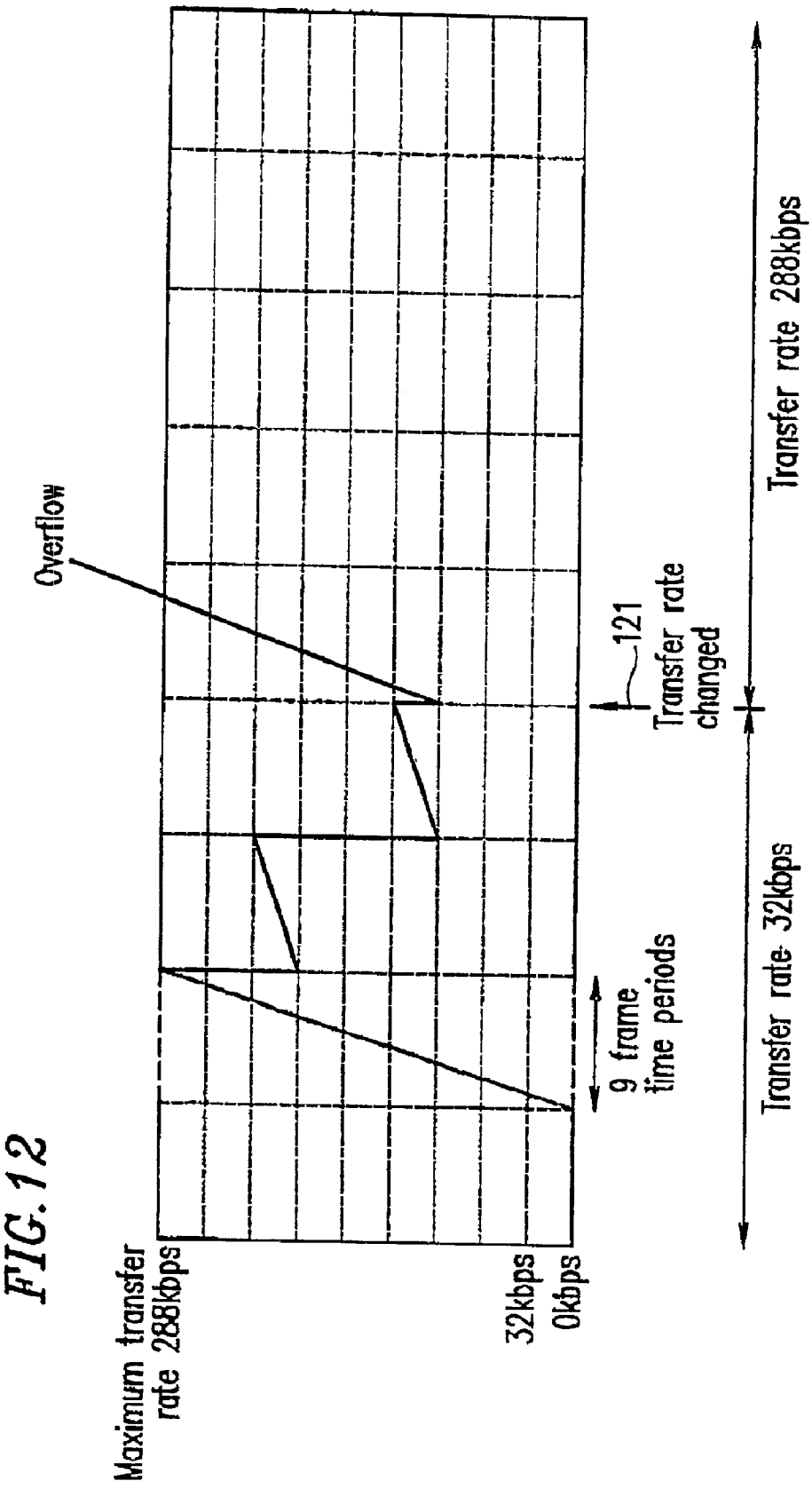

under the page number US 6,904,089 B1

ENCODING DEVICE AND DECODING DEVICE

BACKGROUND OF THE INVENTION

1. Field of the Invention

The present invention relates to an encoding device and a decoding device for transferring data seamlessly without resetting and without any underflow or overflow even when the transfer rate is changed, a broadcasting system including such encoding and decoding devices, and a data storage medium having data obtained by such an encoding device.

2. Description of the Related Art

One format for encoding an audio signal is MPEG2-AAC (Advanced AudioCodec) format. A transmitter for transmitting data (i.e., bit streams) encoded by MPEG2-AAC includes an MPEG2-AAC encoder, and a receiver for receiving the data includes an MPEG2-AAC decoder.

In the MPEG2-AAC encoder, the amount of bit streams generated in each of a plurality of frame time periods (i.e., frame length) is variable, but the transfer rate is constant. Accordingly, in order to transfer all the bit streams generated, the transmitter is required to include an output buffer for storing bit streams, so that the bit streams which cannot be transferred in one frame time period remain in the output buffer. The bit streams remaining in the output buffer are sequentially transferred in the subsequent frame time periods. In order to realize such transfer of bit streams, the amount of the bit streams generated in each frame time period by an encoder is controlled so that the sum of the amount of the bit streams generated in each frame time period and the amount of the bit stream remaining in the output buffer is equal to or greater than the amount corresponding to the transfer rate and equal to or less than the maximum transfer rate.

Such a function of the MPEG2-AAC format is referred to as the "bit reserver". The bit reserver eliminates the necessity of restricting the amount of the bit streams generated in each frame time period in accordance with the transfer rate. Even when the transfer rate is relatively low, the amount of bit streams which is equal to or greater than the amount corresponding to the transfer rate can be generated. Accordingly, an encoder having such a function can provide a higher sound quality as compared to a conventional encoder having the amount of bit stream generated fixed.

FIG. 9 is a graph illustrating an over-time change in the amount of bit streams in a conventional MPEG2-AAC encoder having a maximum possible transfer rate of 288 kbps. In the example shown in FIG. 9, the bit streams are transferred at the rate of 32 kbps.

The vertical axis represents the amount of bit streams generated by the encoder, and the horizontal axis represents the time. Solid line 91 represents the change in the amount to of the bit streams in the encoder. An increase in the bit stream amount in the vertical direction represents generation of the bit streams by an encoder, and a decrease in the bit stream amount in the horizontal direction represents transfer of the bit streams.

In order to receive the bit streams which are generated and transferred in this manner, the receiver having the MPEG2-AAC decoder includes an input buffer. When the bit receiver is used, an underflow in the input buffer, in the decoder needs to be prevented.

FIG. 10 is a graph illustrating an over-time change in the amount of bit streams in a conventional MPEG2-AAC decoder. In the example shown in FIG. 10, the bit streams transferred from the encoder described in relation to FIG. 9 are processed by the decoder with a delay amount of 1. Herein, the term "delay amount of 1" is defined to mean that the time period elapsed between the generation of the data by the encoder and the consumption (i.e., decoding) of the data by the decoder is 1 frame. In FIG. 10, an increase in the bit stream amount in the horizontal direction represents transfer of the bit streams, and a decrease in the bit stream amount in the vertical direction represents consumption of the bit streams by the decoder.

When the bit streams transferred from the encoder described in relation to FIG. 9 are decoded by the decoder with a delay amount of 1 as shown in FIG. 10, an underflow occurs. Although not shown, the same is true when the transfer is performed with a delay amount of 2.

In the example shown in FIG. 9, bit streams corresponding to the transfer rate of 288 kbps can be generated when the transfer rate is 32 kbps. In order to allow the decoder to decode the bit streams corresponding to the rate of 288 kbps, a delay amount of 288 kbps/32 kbps=9 frame time periods is required.

FIG. 11A is a graph illustrating an over-time change in the amount of bit streams in another conventional MPEG2-AAC encoder having a maximum possible transfer rate of 288 kbps. FIG. 11B is a graph illustrating an over-time change in the amount of bit streams in another conventional MPEG2-AAC decoder. In the example shown in FIG. 11B, the bit streams generated and transferred as shown in FIG. 11A are decoded by the decoder with a delay amount of 9. In order to prevent an underflow, the bit streams are generally required to be temporarily stored in the input buffer in the decoder before the decoding is started. In the example shown in FIG. 11B, the underflow is prevented by storing the bit streams corresponding to the rate of 288 kbps in the input buffer before the decoding is started.

Even after the decoding is started, it is also necessary to prevent an underflow and an overflow in the input buffer of the decoder when the transfer rate is changed.

FIG. 12 is a graph illustrating an over-time change in the amount of bit streams in still another conventional MPEG2-AAC decoder. In the example shown in FIG. 12, the transfer rate is changed from 32 kbps to 288 kbps at the point represented by arrow 121. At the time of the change, an overflow occurs in the input buffer of the decoder because a required delay amount is changed when the transfer rate is changed.

In order to avoid such an overflow, the input buffer in the decoder needs to have a size corresponding to 288 kbps×9, and the delay amount needs to be constant regardless of the transfer rate. Alternatively, the encoder needs to temporarily stop encoding when the transfer rate is changed to empty the output buffer and restart encoding after the decoder decodes all the bit streams. In such a case, the decoder restarts decoding after the bit streams corresponding to 288 kbps are stored in the input buffer after the encoder restarts encoding. This system is described in detail in Japanese Laid-Open Publication No. 10-374272 entitled "Encoding Device and Decoding Device".

In a conventional data transfer system, an encoding device from which data is transferred and a decoding device to which the data is transferred both include a reset device for resetting encoding and decoding when a transfer condition such as the transfer rate is changed. Accordingly, in order to avoid resetting from being performed simultaneously with program reproduction, the data to be transferred includes a sufficient time duration of a silent portion.

The above-described encoding device and decoding device for solving the overflow and underflow involve problems such that seamless processing is impossible, the buffer amount significantly increases, and the delay amount is excessively large.

When the input buffer in the decoder has a size corresponding to maximum transfer rate×delay amount, the capacity of the input buffer is significantly increased. When the delay amount is made constant regardless of the transfer rate, the delay amount becomes excessively larger. When the encoding is temporarily stopped when the transfer rate is changed, the interruption in the processing prevents seamless processing.

In the above-mentioned conventional data transfer system, whenever the transfer rate is changed, resetting needs the be performed, which inconveniently requires the parameter changes in the encoding and decoding to be communicated to the encoding device and the decoding device beforehand.

Since the time duration from the start to termination of resetting (reset time) varies depending on each individual encoding device or decoding device, the data transfer system sets the reset time sufficiently long in consideration of the device-to-device dispersion in the reset time. As a result, the data to be transferred includes an unnecessarily long silent portion.

Moreover, in the above-mentioned conventional data transfer system, the decoding device forcibly clears the bit streams which have not been decoded when resetting is performed. In order to avoid this, the encoding device needs to insert bit streams corresponding to a silent signal into the audio signal bit streams for a sufficiently long time duration from before the start until after the termination of resetting.

SUMMARY OF THE INVENTION

According to one aspect of the invention, an encoding device includes an encoding section for generating bit streams having a variable frame length from an input audio signal, a maximum frame length of the bit streams being fixed; a storage section for storing the bit streams generated by the encoding section; and a transfer section for transferring the bit streams at a prescribed transfer rate. The storage section includes a buffer having a capacity corresponding to at least a value which is obtained by subtracting an amount of the bit streams transferable in one frame time period at a minimum possible transfer rate from a value of twice the maximum frame length.

According to another object of the invention, an encoding device includes an encoding section for generating bit streams having a variable frame length from an input audio signal, a maximum frame length of the bit streams being fixed; a storage section for storing the bit streams generated by the encoding section; and a transfer section for transferring the bit streams at a prescribed transfer rate. The storage section includes a buffer having a capacity of at least a value which corresponds to the maximum frame length. The encoding section generates the bit streams so that a sum of an amount of the bit streams stored in the storage section at the moment when the bit streams for one frame time period generated and an amount of the bit streams for the one frame time period is equal to or less than the capacity of the storage section.

According to still another aspect of the invention, an encoding device, for generating and transferring bit streams to a decoding device including a bit accumulation section for accumulating the bit streams and a decoding section for decoding the bit streams accumulated in the bit accumulation section, includes an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate in the encoding section. The encoding section stops generation of the bit streams when the transfer rate is changed by the condition setting section and suspends the generation of the bit streams at least until a usable capacity of the bit stream accumulation section made by decoding of the bit streams by the decoding section becomes equal to or greater than the maximum frame length.

According to still another aspect of the invention, an encoding device includes an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate in the encoding section. The encoding section generates the bit streams in an amount corresponding to the maximum frame length in one frame time period immediately after the transfer rate is changed.

According to still another aspect of the invention, an encoding device, for generating and transferring bit streams to a decoding device including a bit accumulation section for accumulating the bit streams and a decoding section for decoding the bit streams accumulated in the bit accumulation section, includes an encoding section for generating bit streams having a variable frame length from an input audio signal, a maximum frame length of the bit steams being fixed; a storage section for storing the bit streams generated by the encoding section; a transfer section for transferring the bit streams at a prescribed transfer rate; a condition setting section for setting a transfer rate in the encoding section; and a decoding time information designation section for adding decoding time information to the bit streams. The encoding section stops generation of the bit streams when the transfer rate is changed by the condition setting section and suspends the generation of the bit streams at least until a usable capacity of the bit stream accumulation section made by decoding of the bit streams by the decoding section becomes equal to or greater than the maximum frame length, and adds decoding time designation information to the bit streams in one frame time period immediately after the transfer rate is changed, the decoding time designation information being obtained by adding a value of time when transfer of the bit streams at a post-change transfer rate is started and a value of at least a time period in which the bit streams of the maximum frame length transferred at the post-change transfer rate are to be accumulated in the bit stream accumulation section.

According to still another aspect of the invention, a decoding device, for converting bit streams produced by the above-described encoding device into an audio signal, includes a bit stream accumulation section for accumulating the bit streams; and a decoding section for decoding the bit streams accumulated in the bit stream accumulation section. The bit stream accumulation section includes a buffer having a capacity corresponding to at least a value which is obtained by multiplying the maximum frame length of the bit streams with a value obtained by dividing a maximum possible transfer rate by a minimum possible transfer rate. The decoding section starts decoding the bit streams after accumulating, in the bit stream accumulation section, the bit streams for a time period of a value obtained by multiplying one frame time period with a value obtained by dividing the maximum possible transfer rate by the minimum possible transfer rate.

According to still another aspect of the invention, a decoding device, for converting bit streams produced by the above-described encoding device into an audio signal, includes a bit stream accumulation section for accumulating the bit streams; and a decoding section for decoding the bit streams accumulated in the bit stream accumulation section. The bit stream accumulation section includes a buffer having a capacity corresponding to at least a value of the maximum frame length of the bit streams. The decoding section starts decoding the bit streams simultaneously when the accumulation of the bit streams in the bit stream accumulation section is started; and when an amount of the bit streams remaining in the bit stream accumulation device becomes a prescribed level larger than 0, the decoding section suspends the decoding the bit streams until the bit streams are accumulated sufficiently to prevent an underflow.

According to still another aspect of the invention, a decoding device, for converting bit streams produced by the above-described encoding device into an audio signal, includes a bit stream accumulation section for accumulating the bit streams; and a decoding section for decoding the bit streams accumulated in the bit stream accumulation section. The bit stream accumulation section includes a buffer having a capacity corresponding to at least a value of the maximum frame length of the bit streams. The decoding section decodes the decoding time designation information added to the bit streams by the decoding time designation section, and starts decoding the bit streams at the time designated by the decoding time designation information.

According to still another aspect of the invention, a broadcasting system including a transmitter for encoding an audio signal into bit streams and transmitting the bit streams, and a receiver for receiving the bit streams and decoding the bit streams into the audio signal, wherein the audio signal is encoded by the above-described encoding device.

According to still another aspect of the invention, a broadcasting system includes an encoding device and a decoding device. The encoding device includes an encoding section for generating bit streams having a variable frame length from an input audio signal, a maximum frame length of the bit streams being fixed; a storage section for storing the bit streams generated by the encoding section; and a transfer section for transferring the bit streams at a prescribed transfer rate. The storage section includes a buffer having a capacity corresponding to at least a value which is obtained by subtracting an amount of the bit streams transferable in one frame time period at a minimum possible transfer rate from a value of twice the maximum frame length. The decoding device includes a bit stream accumulation section for accumulating the bit streams; and a decoding section for decoding the bit streams accumulated in the bit stream accumulation section. The bit stream accumulation section includes a buffer having a capacity corresponding to at least a value which is obtained by multiplying the maximum frame length of the bit streams with a value obtained by dividing a maximum possible transfer rate by a minimum possible transfer rate. The decoding section starts decoding the bit streams after accumulating the bit streams for a time period of a value obtained by multiplying one frame time period with a value obtained by dividing the maximum possible transfer rate by the minimum possible transfer rate.

According to still another aspect of the invention, a broadcasting system includes an encoding device and a decoding device. The encoding device includes an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate in the encoding section. The encoding section stops generating of the bit streams when the transfer rate is changed by the condition setting section and suspends the generation of the bit streams at least until a usable capacity of the bit stream accumulation section made by decoding of the bit streams by the decoding section becomes equal to or greater than the maximum frame length. The decoding device includes a bit stream accumulation section for accumulation the bit streams; and a decoding section for decoding the bit streams accumulated in the bit stream accumulation section. The bit stream accumulation section includes a buffer having a capacity corresponding to at least a value of the maximum frame length of the bit streams. The decoding section starts decoding the bit streams simultaneously when the accumulation of the bit streams in the bit stream accumulation section is started; and when an amount of the bit streams remaining in the bit stream accumulation device becomes a prescribed level greater than 0, the decoding section suspends the decoding the bit streams until the bit streams are accumulated sufficiently to prevent an underflow.

According to still another aspect of the invention, a broadcasting system includes an encoding device and a decoding device. The encoding device includes an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate in the encoding section. The encoding section stops generation of the bit streams when the transfer rate is changed by the condition setting section and suspends the generation of the bit streams at least until a usable capacity of the bit stream accumulation section made by decoding of the bit streams by the decoding section becomes equal to or greater than the maximum frame length. The decoding device includes a bit stream accumulation section for accumulating the bit streams; and a decoding section for decoding the bit streams accumulated in the bit stream accumulation section. The bit stream accumulation section includes a buffer having a capacity corresponding to at least a value of the maximum frame length of the bit streams. The decoding section decodes the decoding time designation information added to the bit streams by the decoding time designation section, and starts decoding the bit streams at the time designation by the decoding time designation information.

According to still another aspect of the invention, in a data storage medium having bit streams obtained by encoding an audio signal stored thereon, the bit streams are produced by the above-described encoding device.

According to still another aspect of the invention, an encoding device includes an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate. The transfer rate is equal to or less than a prescribed maximum possible transfer rate. A maximum amount of the bit streams generated by the encoding section is restricted in accordance with the transfer rate and the maximum possible transfer rate.

In one embodiment of the invention, the maximum amount of the bit streams generated by the encoding section is restricted so that a sum of a maximum possible amount of the bit streams stored in the storage section and the maximum amount of the bit streams generated by the encoding section is equal to or less than whichever is the smaller of a value corresponding to the prescribed maximum possible transfer rate or a value corresponding to n times the transfer rate, where n is an integer of 1 or more.

In one embodiment of the invention, the maximum amount of the bit streams generated by the encoding section in each of at least one frame time period immediately before and immediately after the transfer rate is changed by the condition setting section is restricted.

In one embodiment of the invention, the maximum amount of the bit streams generated by the encoding section in each of at least one frame time period immediately before the transfer rate is changed by the condition setting section is restricted, so that a sum of a maximum possible amount of the bit streams stored in the storage section in one frame immediately before the transfer rate is changed and the maximum amount of the bit streams generated by the encoding section corresponds to the pre-change transfer rate.

In one embodiment of the invention, when the post-transfer rate is higher than the pre-change transfer rate, the maximum amount of the bit streams generated by the encoding section is restricted so that a sum of a maximum possible amount of the bit streams stored in the storage section in one frame time period immediately after the transfer rate is changed and the maximum amount of the bit streams generated by the encoding section corresponds to the post-change transfer rate.

In one embodiment of the invention, when the post-transfer rate is lower than the pre-change transfer rate, the maximum amount of the bit streams generated by the encoding section in each of at least one frame time period immediately before the transfer rate is changed by the condition setting section is restricted so that a sum of a maximum possible amount of the bit streams stored in the storage section in one frame time period immediately before the transfer rate is changed and the maximum amount of the bit streams generated by the encoding section corresponds to the pre-change transfer rate.

According to still another aspect of the invention, a decoding device, for decoding bit streams generated from an audio signal and transmitted from an encoding device including an encoding section for generating bit streams having a variable frame length from an input audio signal, a maximum frame length of the bit streams being fixed; a storage section for storing the bit streams generated by the encoding section; a transfer section for transferring the bit streams at a prescribed transfer rate; and a condition setting section for setting a transfer rate, wherein the transfer rate is equal to or less than a prescribed maximum possible transfer rate, and a maximum amount of the bit streams generated by the encoding section is restricted in accordance with the transfer rate and the maximum possible transfer rate, includes an accumulation section for accumulating the bit streams; and a decoding section for decoding the bit streams accumulated by the accumulating section into the audio signal. The accumulation section has a capacity corresponding to n times the prescribed maximum possible transfer rate, and the decoding section decodes the bit streams after the accumulation section accumulates the bit streams for at least one frame time period.

In one embodiment of the invention, the encoding device further includes a decoding time information designation section for adding decoding time information to the bit streams, and the accumulation section refers to the decoding time information to determine a time period in which the bit streams are to be accumulated in the accumulation section.

According to still another aspect of the invention, a broadcasting system using variable frame length bit streams, a maximum frame length of which is fixed, the includes the above-mentioned encoding device.

In one embodiment of the invention, the broadcasting system further includes a decoding device for decoding the bit streams output from the encoding device.

According to still another aspect of the invention, in a storage medium having bit stream having a variable frame length stored thereon, the bit streams is generated from an audio signal input to the above-described encoding device.

Thus, the invention described herein makes possible the advantages of providing (1) an encoding device and a decoding device for transferring data without resetting and thus seamlessly without any underflow or overflow, with a smaller delay amount and a smaller buffer capacity as compared to the prior art even when the transfer rate is changed, a broadcasting system including such encoding and decoding device, and a data storage medium having bit streams obtained by such an encoding device stored thereon; and (2) an encoding device for preventing generation of a silent portion in the program, a decoding device for decoding bit streams obtained by such an encoding device, a broadcasting system including such encoding and decoding devices, and a data storage medium having bit streams obtained by such an encoding device stored thereon.

These and other advantages of the present invention will become apparent to those skilled in the art upon reading and understanding the following detailed description with reference to the accompanying figures.

BRIEF DESCRIPTION OF THE DRAWINGS

FIGS. 4A and 4B are graphs illustrating an over-time change in the bit stream amount respectively in a bit stream storage device and a bit stream accumulation device of the broadcasting system shown in FIG. 3 in the second example;

FIG. 6 is a graph illustrating an over-time change in the bit stream amount in the bit stream storage device and the bit stream accumulation device of the broadcasting system shown in FIG. 3 by an operation in a third example according to the present invention;

FIG. 9 is a graph illustrating an over-time change in the amount of bit streams in a conventional MPEG2-AAC encoder;

FIG. 10 is a graph illustrating an over-time change in the amount of bit streams in a conventional MPEG2-AAC decoder;

FIG. 12 is a graph illustrating an over-time change in the amount of bit streams in still another conventional MPEG2-AAC decoder.

DESCRIPTION OF THE PREFERRED EMBODIMENTS

Figure 1:
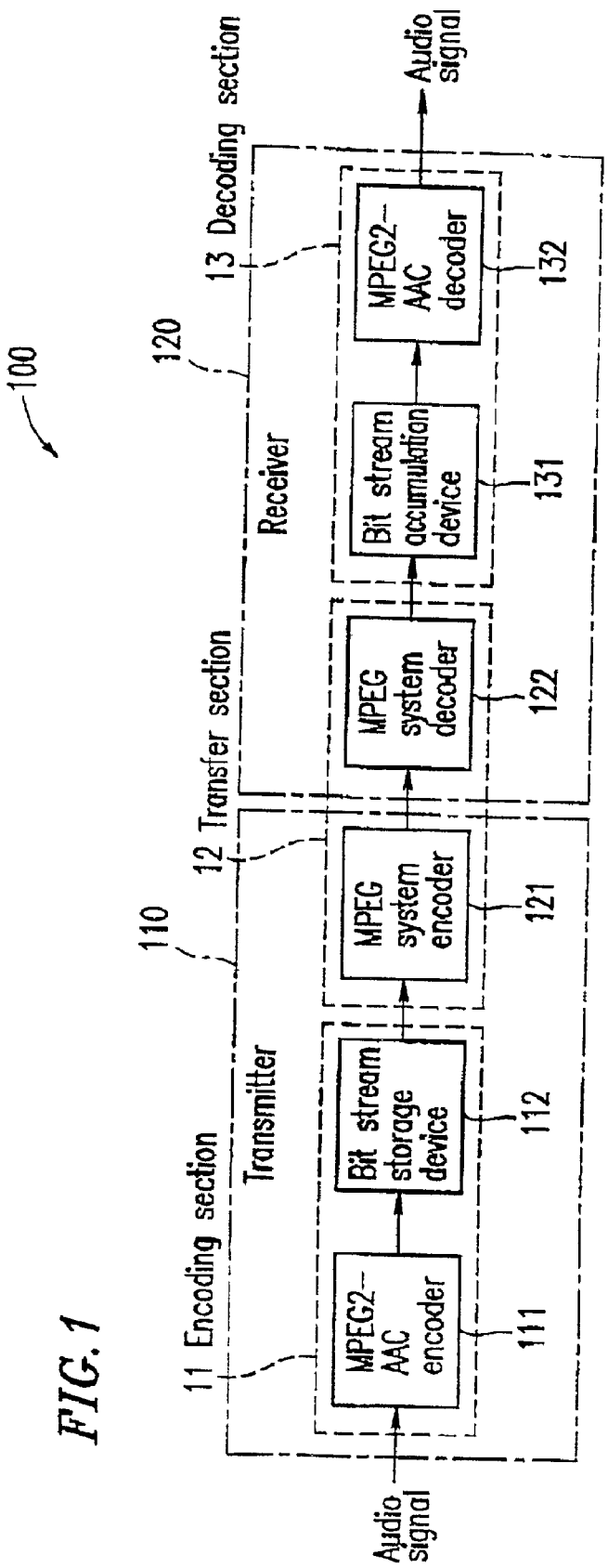
FIG. 1 is a block diagram showing a broadcasting system in a first example according to the present invention.

Hereinafter, the present invention will be described by way of illustrative examples with reference to the accompanying drawings.

According to a first principle of the present invention, the encoding device and the decoding device each include a buffer as, for example, a bit stream buffer defined by ISO/IEC13818-3 having a data storage capacity which is sufficient to always secure the maximum delay amount required from the generation of the bit streams until the consumption of the bit streams. The maximum delay amount is generated before starting the decoding.

Thus, encoding and decoding are performed without resetting which is performed in the conventional data transfer system or without generation of bit streams corresponding to a silent portion (0-level output) even when the transfer rate is changed.

According to a second principle of the present invention, a manner of generating bit streams in the encoding device is defined, and the decoding device includes a buffer having a data storage capacity which is sufficient to always secure the maximum delay amount required from the generation of the bit streams until the consumption of the bit streams. The maximum delay amount is generated before starting the decoding.

Thus, encoding and decoding are performed without resetting which is performed in the conventional data transfer system or without generation of bit streams corresponding to a silent portion (0-level output) even when the transfer rate is changed.

According to a third principle of the present invention, the operation of the encoding device when the transfer rate is changed is controlled.

Thus, the problem with the conventional art, that the resetting is performed when the transfer rate is changed and a sufficiently long time duration of silent portion needs to be included in the data to be transferred in order to avoid resetting from being simultaneously performed with the program reproduction, is solved without increasing the buffer amount of the encoding device or decoding device.

According to a fourth principle of the present invention, the manner of generating the bit streams by the encoding device when the transfer rate is changed is controlled.

Thus, the transfer rate is changed without resetting, with the silent portion in the data to be transferred being minimized. As a result, the problem with the conventional art that a sufficiently long time duration of silent portion needs to be included in the data to be transferred in order to avoid resetting from being simultaneously performed with the program reproduction is solved.

According to a fifth principle of the present invention, decoding time designation information is inserted into bit streams so as to define the decoding time of the bit streams in the decoding device.

Thus, the transfer rate is changed without resetting, with the silent portion in the data to be transferred being minimized. As a result, the problem with the conventional art that a sufficiently long time duration of silent portion needs to be included in the data to be transferred in order to avoid resetting from being simultaneously performed with the program reproduction is solved.

Accordingly, according to the present invention, the data transfer is performed seamlessly without any underflow or overflow in the buffer in the encoding device or the buffer in the decoding device.

The data transfer system described in the following examples is a broadcasting system conforming to MPEG2-AAC (ISO/IEC13818-7).

According to the broadcasting system, an audio signal is encoded into MPEG2-AAC bit streams in a broadcasting station. The MPEG2-AAC bit streams are transferred, e.g., to a household receiver from the broadcasting station in the format of MPEG system streams. The household receiver extracts the MPEG2-AAC bit streams from the MPEG system streams and reproduces the audio signal by decoding the outputs the audio signal.

EXAMPLE 1

In a first example according to the present invention, the above-mentioned first and second principles are utilized.

FIG. 1 is a block diagram showing a broadcasting system (data processing system) 100 for generating MPEG2-AAC bit streams from an audio signal in a broadcasting station and decoding the MPEG2-AAC bit streams and outputted the audio signal by a household receiver.

As shown in FIG. 1, the broadcasting system 100 includes a transmitter 110 provided in a broadcasting station for transmitting an audio signal for broadcasting, and a receiver 120 provided, e.g., in a house for receiving the audio signal transmitted from the transmitter 100. Devices required for wireless broadcasting such as a modulator and demodulator are provided between the transmitter 110 and the receiver 120, but these devices will be omitted for the simplicity of description.

The broadcasting system 100 includes an encoding section 11 for encoding an audio signal recorded in the broadcasting station into bit streams, a transfer section 12 for transferring the bit streams from the broadcasting station to the receiver 120, and a decoding section 13 for decoding the transferred bit streams and reproducing the audio signal.

The encoding section 11 includes an MPEG2-AAC encoder 111 for encoding the audio signal and generating MPEG2-AAC bit streams, and a bit stream storage device 112 for storing the MPEG2-AAC bit streams. The MPEG2-AAC encoder 111 encodes the audio signal to generate variable frame length bit streams as the MPEG2-AAC bit streams. The MPEG2-AAC bit streams are input to the transfer section 12 at a prescribed transfer rate. The encoding performed by the MPEG2-AAC encoder 111 is controlled so as to avoid an underflow in the transfer section 12.

The transfer section 12 includes an MPEG system encoder 121 for putting the MPEG2-AAC bit streams obtained by encoding the audio signal together with other data streams (for example, data streams obtained by encoding video data), adding assisting information for allowing the streams to be distinguishable from each other at the receiver 120, and outputting the streams as system streams, and an MPEG system decoder 122 for extracting the MPEG2-AAC bit streams from the system streams. In this example, the maximum possible transfer rate is 288 kbps, and the minimum possible transfer rate is 32 kbps.

The decoding section 13 includes a bit stream accumulation device 131 for accumulating the MPEG2-AAC bit streams extracted from the system streams, and an MPEG2-AAC decoder 132 for decoding the MPEG2-AAC bit streams into the audio signal and outputting the audio signal.

The MPEG2-AAC encoder 111, the bit stream storage device 112, and the MPEG system encoder 121 are included in the transmitter 110. The MPEG system decoder 122, the bit stream accumulation device 131, and the MPEG2-AAC decoder 132 are included in the receiver 120.

An exemplary operation of the broadcasting system 100 will be described.

When the audio signal is input to the encoding section 11, the audio signal is encoded by the MPEG2-AAC encoder 111. The resultant MPEG2-AAC bit streams are stored in the bit stream storage device 112.

The MPEG2-AAC bit streams in the bit stream storage device 112 are input to the MPEG system encoder 121 in the transfer section 12 to be converted into system streams. The resultant system streams are transmitted from the transmitter 110 to the receiver 120.

In the receiver 120, the MPEG2-AAC bit streams are extracted from the system streams by the MPEG system decoder 122. The resultant MPEG2-AAC bit streams are input to the decoding section 13 at the same transfer rate as the transfer rate at which the MPEG2-AAC bit streams are input from the encoding section 11 to the transfer section 12.

The MPEG2-AAC bit streams are accumulated in the bit stream accumulation device 131, and then decoded by the MPEG2-AAC decoder 132 into the audio signal and output outside.

Figure 2A:
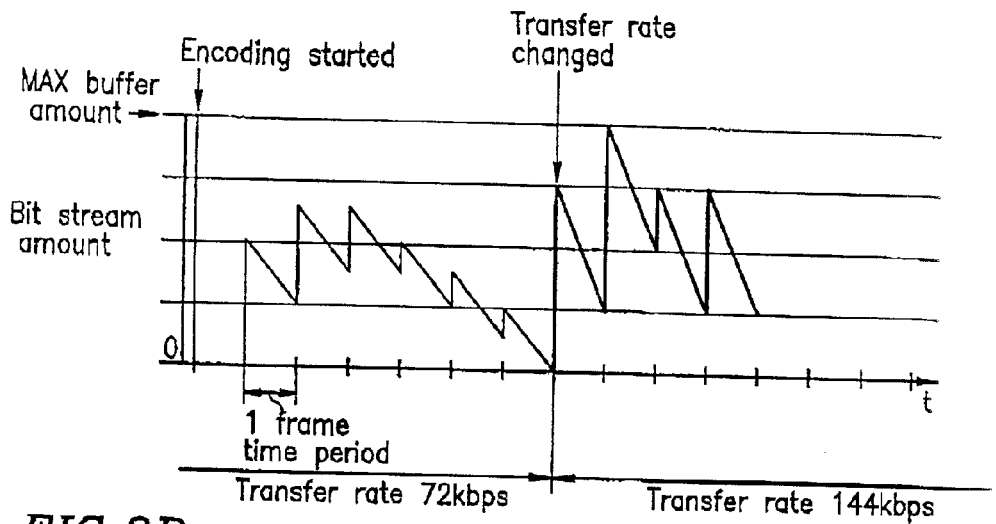
FIGS. 2A and 2B are graphs illustrating an over-time change in the bit stream amount respectively in an encoder buffer and a decoder buffer.
Figure 2B:
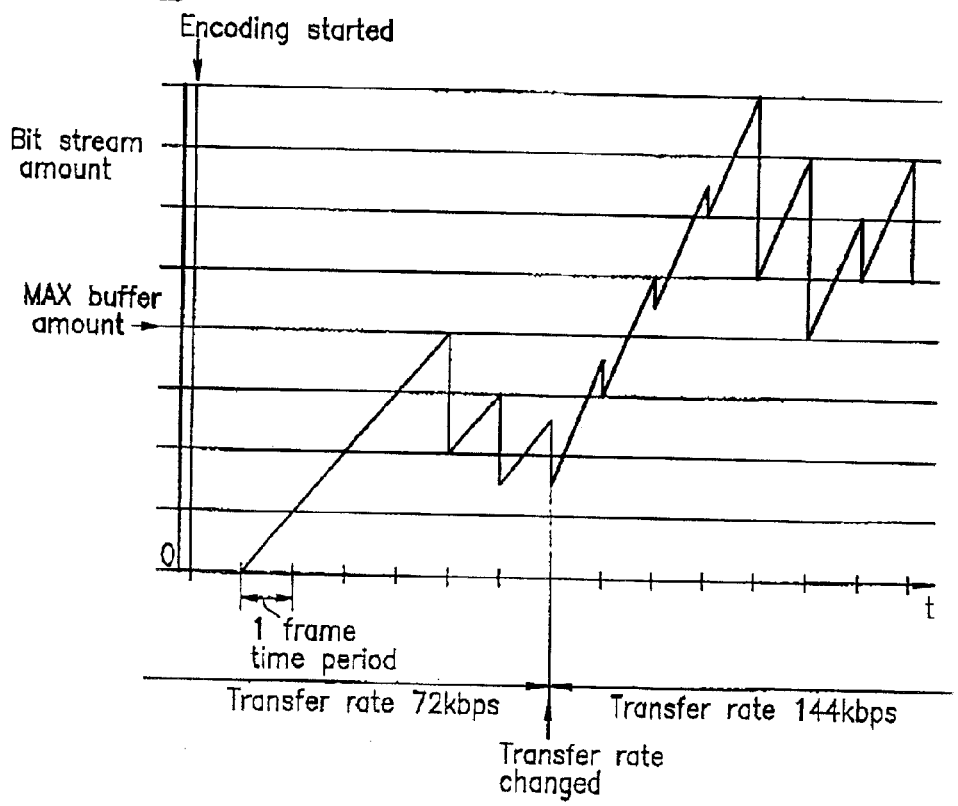

FIG. 2A is a graph illustrating a change in the bit stream amount in an encoder buffer and FIG. 2B is a graph illustrating a change in the bit stream amount in a decoder buffer when the transfer rate is changed from 72 kbps (¼ of the maximum possible transfer rate of 288 kbps) to 144 kbps (½ of the maximum possible transfer rate). In correspondence with the context of the first example, the encoder buffer corresponds to the bit stream storage device 112 in FIG. 1, and the decoder buffer corresponds to the bit stream accumulation device 131 in FIG. 1.

According to the prior art, the buffer amount in each of the encoder buffer and the decoder is defined to correspond to at least the maximum frame length of the MPEG2-AAC bit streams generated by the MPEG2-AAC encoder (i.e., the maximum amount of the MPEG2-AAC bit streams generated in one frame time period). Therefore, for example, when the transfer rate is changed from 72 kbps to 144 kbps, the decoder buffer overflow and thus the processing cannot be performed smoothly as shown in FIG. 2B.

This occurs for the following reason. Although the above-mentioned problem occurs in the prior art, the reference numerals shown in FIG. 1 will be used in the following explanation of the reason for the sake of simplicity.

The delay amount from the generation of the i'th frame bit streams in the MPEG2-AAC decoder 111 until the consumption of the i'th frame bit streams by the MPEG2-AAC decoder 132 is represented by the number of frame time periods, which is a ratio of the maximum possible transfer rate (288 kbps) with respect to the current transfer rate. For example, when the transfer rate is 72 kbps, the delay amount is 4 frame time periods (288 kbps/72 kbps); and when the transfer rate is 144 kbps, the delay amount is 2 frame time periods (288 kbps/144 kbps).

However, when the transfer rate is changed without performing the above-described delay amount correction, the average frame length becomes twice as large but the delay amount remains the same. Accordingly, the buffer amount required in the decoder buffer may be undesirably insufficient and an overflow occurs.

In the first example according to the present invention, the capacity of the bit stream accumulation section 131 is made 9 times the maximum frame length of the bit streams (288/32=9) and the MPEG2-AAC decoder 132 starts decoding after the delay amount of 9 frame time periods. Thus, the bit stream accumulation section 131 does not overflow even when the transfer rate is changed from the minimum rate (32 kbps) to the maximum rate (288 kbps). Accordingly, the transfer rate can be changed without resetting.

In the first example, the delay amount of the generation until the consumption of the bit streams is constant (9 frame time periods). This also provides the effect that the audio signal obtained by decoding performed by the MPEG2-AAC decoder 132 may be reproduced seamlessly even when the transfer rate is changed.

EXAMPLE 2

In a second example according to the present invention, the above-mentioned third, fourth and fifth principles are utilized.

Figure 3:
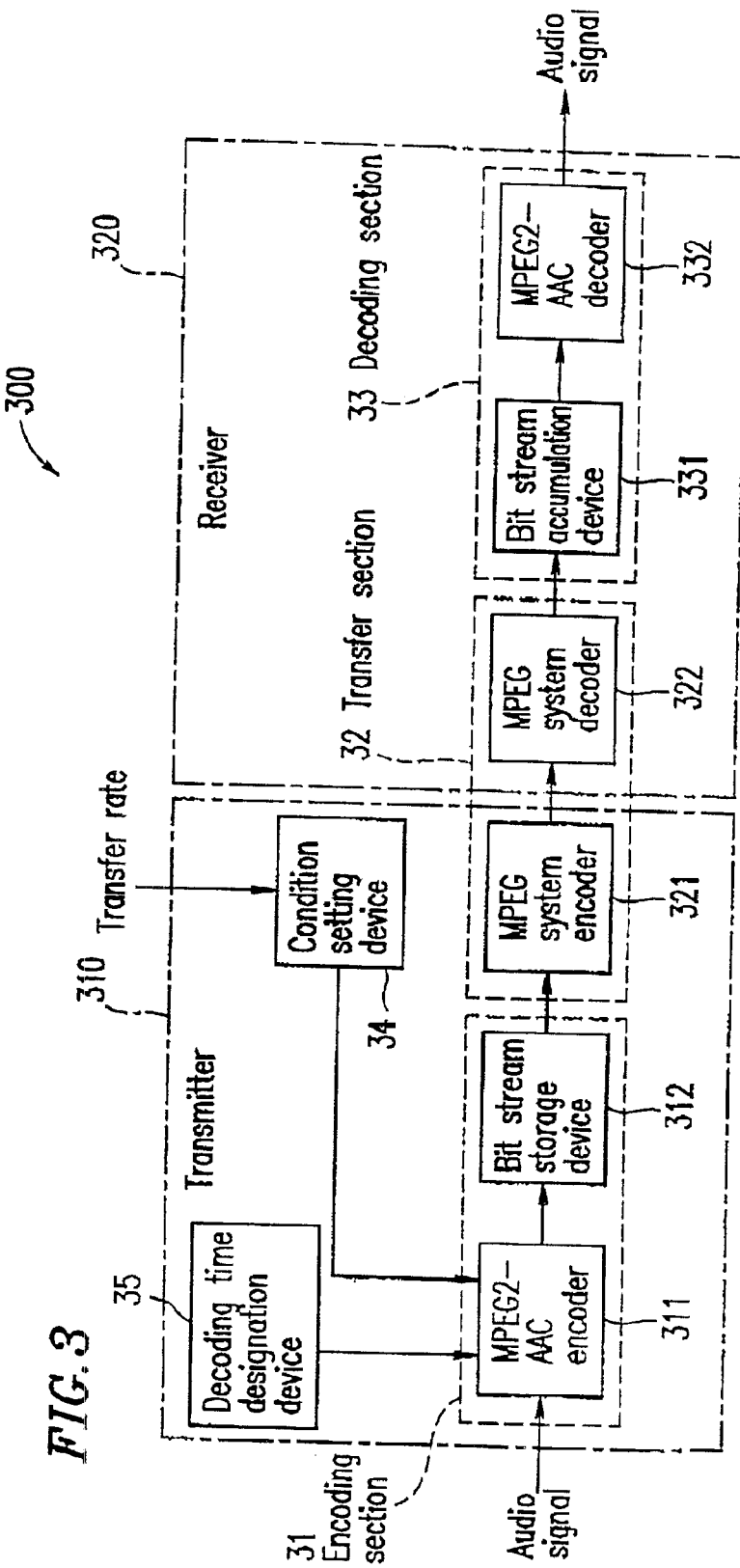
FIG. 3 is a block diagram showing a broadcasting system in second, third and fourth examples according to the present invention.

FIG. 3 is a block diagram showing a broadcasting system (data processing system) 300 for generating MPEG2-AAC bit streams from an audio signal in a broadcasting station and decoding the MPEG2-AAC bit streams and outputting the audio signal by, e.g., a household receiver.

As shown in FIG. 3, the broadcasting system 300 includes a transmitter 310 provided in a broadcasting station for transmitting an audio signal for broadcasting, and a receiver 320 provided in, e.g., a house for receiving the audio signal transmitted from the transmitter 310. Devices required for wireless broadcasting such as a modulator and demodulator are provided between the transmitter 310 and the receiver 320, but these devices will be omitted for the simplicity of description.

The broadcasting system 300 includes an encoding section 31 for encoding an audio signal obtained in the broadcasting station into bit streams, a transfer section 32 for transferring the bit stream from the broadcasting station to the receiver 320, and a decoding section 33 for decoding the transferred bit stream and reproducing the audio signal.

The encoding section 31 includes an MPEG2-AAC encoder 311 for encoding the audio signal and generating an MPEG2-AAC bit stream, and a bit stream storage device 312 for storing the MPEG2-AAC bit streams. The transfer section 32 includes an MPEG system encoder 321 for putting the MPEG2-AAC bit streams obtained by encoding the audio signal together with other data streams, adding assisting information for allowing the streams to be distinguishable from each other at the receiver 320, and outputting the streams as system streams, and an MPEG system decoder 322 for extracting the MPEG2-AAC bit streams from the system streams. The decoding section 33 includes a bit stream accumulation device 331 for accumulating the MPEG2-AAC bit streams extracted from the system streams, and an MPEG2-AAC decoder 332 for decoding the MPEG2-AAC bit streams into the audio signal and outputting the audio signal.

The MPEG2-AAC encoder 311, the bit stream storage device 312, and the MPEG system encoder 321 are included in a transmitter 310. The MPEG system decoder 322, the bit stream accumulation device 331, and the MPEG2-AAC decoder 332 are included in the receiver 320.

The transmitter 310 further includes a condition setting device 34 for setting operating conditions of the encoding section 31. Reference numeral 35 represents a decoding time information designation device, which will be described later.

An exemplary operation of the broadcasting system 300 will be described.

The audio signal recorded in the broadcasting station is input to the encoding section 31. The audio signal is encoded by the MPEG2-AAC encoder 311 into the variable frame length MPEG2-AAC bit streams by a method described in ISO/IEC13818-7. The resultant MPEG2-AAC bit streams are stored in the bit stream storage device 312. The bit stream storage device 312 has a capacity to store the bit streams corresponding to the maximum possible transfer rate which can be set by the condition setting device 34 (MAX buffer amount).

The MPEG2-AAC bit streams are input to the MPEG system encoder 321 in the transfer section 32 at a prescribed transfer rate which is set by the condition setting device 34. In the following description, the transfer rate which can be set by the condition setting device 34 is 288 kbps at the maximum and 32 kbps at the minimum.

The MPEG2-AAC bit streams are converted into the MPEG system streams by the MPEG system encoder 321 and transferred to the MPEG system decoder 322. When the transfer from the MPEG system encoder 321 to the MPEG system decoder 322 is performed at the same transfer rate as the transfer rate by which the bit streams are input from the bit stream storage device 312 to the MPEG system encoder 321, the generation of the bit streams in the MPEG2-AAC encoder 311 is controlled so as to avoid an underflow in the transfer section 32. The generation of the bit streams in the MPEG2-AAC encoder 311 is also controlled so that the bit stream amount stored in the bit stream storage device 312 is restricted to whichever is the smaller of (i) the amount corresponding to n times the transfer rate which is set by the condition setting device 34 or (ii) the amount corresponding to the maximum possible transfer rate which can be set by the condition setting device 34. Herein, "N" refers to the delay amount in terms of the number of frame time periods from the generation until the consumption of the bit streams. Herein, "n" is an integer of 1 or greater.

When, for example, the delay amount is 2 frame time periods, N=2. When the transfer rate is 32 kbps, the bit stream amount in the bit stream storage device 312 is 64 kbps. Similarly, when the transfer rate is 64 kbps, the bit stream amount in the bit stream storage device 312 is 128 kbps. When the transfer rate is 128 kbps, the bit stream amount in the bit stream storage device 312 is 256 kbps. When the transfer rate is 144 kbps or more, the bit stream amount in the bit stream storage device 312 is 288 kbps or more. The following description will be conducted with the assumption of N=2.

When the transfer rate is changed by the condition setting device 34, the bit stream amount stored in the bit stream storage device 312 in one frame time period immediately before the change is restricted to the amount corresponding to the transfer rate which is set by the condition setting device 34. The generation of the bit streams by the MPEG2-AAC encoder 311 is controlled so as to fulfill the restriction.

After the MPEG system streams are transmitted to the MPEG system decoder 322, the MPEG2-AAC bit streams are extracted from the MPEG system streams by the MPEG system decoder 322. The MPEG2-AAC bit streams are accumulated in the bit stream accumulation device 331, and then transferred to the MPEG2-AAC decoder 332 in the decoding section 33 at the same transfer rate as the transfer rate at which the bit streams are input from the encoding section 31 to the transfer section 32. The MPEG2-AAC bit streams are accumulated in the bit stream accumulation device 331 and decoded by the MPEG2-AAC decoder 332 into the audio signal and output outside. The bit stream accumulation device 331 has a capacity to store the bit streams corresponding to n times the maximum possible transfer rate which can be set by the condition setting device 34. When, for example, the maximum possible transfer rate is 288 kbps and N=2, the bit stream accumulation device 331 can accumulate the bit streams corresponding to 576 kbps.

As described above, FIG. 2A illustrates a change in the bit stream amount in an encoder buffer and FIG. 2B illustrates a change in the bit stream amount in a decoder buffer when the transfer rate is changed from 72 kbps (¼ of the maximum possible transfer rate of 288 kbps) to 144 kbps (½ of the maximum possible transfer rate). In correspondence with the second example, the encoder buffer corresponds to the bit stream storage device 312 in FIG. 3, and the decoder buffer corresponds to the bit stream accumulation device 331 in FIG. 3.

According to the prior art, the buffer amount in each of the encoder buffer and the decoder buffer is defined to correspond to at least the maximum frame length of the MPEG2-AAC bit streams generated by the MPEG2-AAC encoder. Therefore, for example, when the transfer rate is changed from 72 kbps to 144 kbps and again to 72 kbps, the decoder buffer overflows and thus the processing cannot be performed smoothly as shown in FIG. 2B.

This occurs for the following reason. Although the above-mentioned problem occurs in the prior art, the reference numerals shown in FIG. 3 will be used in the following explanation of the reason for the sake of simplicity.

The delay amount from the generation of the i'th frame bit streams in the MPEG2-AAC encoder 311 until the consumption of the i'th frame bit streams in by the MPEG2-AAC decoder 332 is represented by the number of frame time periods, which is a ratio of the maximum possible transfer rate (288 kbps) with respect to the current transfer rate. For example, when the transfer rate is 72 kbps, the delay amount is 4 frame time periods (288 kbps/72 kbps); and when the transfer rate is 144 kbps, the delay amount is 2 frame time periods (288 kbps/144 kbps).

However, when the transfer rate is changed without performing the above-described delay amount correction, the average frame length becomes twice as large but the delay amount remains the same. Accordingly, the buffer amount required in the decoder buffer may be undesirably insufficient and an overflow occurs.

FIG. 4A illustrates a change in the bit stream amount in an encoder buffer and FIG. 4B illustrates a change in the bit stream amount in a decoder buffer when the transfer rate is changed from 72 kbps (¼ of the maximum possible transfer rate of 288 kbps) to 144 kbps (½ of the maximum possible transfer rate) and again 72 kbps.

In the second example according to the present invention, as shown in FIG. 4A, when a transfer rate, which is different from the transfer rate at which the bit streams are input from the encoding section 31 to the transfer section 32 or the transfer rate at which the bit streams are input from the transfer section 32 to the decoding section 33, is set in the encoding section 31 by the condition setting device 34, the encoding by the MPEG2-AAC encoder 311 is stopped for 3 frame time periods ((maximum possible transfer rate/ transfer rate)−1((288/72)−1) (see time T4 to time T5 in FIG. 4A).

Due to such an operation, as shown by point 41 in FIG. 4A and point 42 in FIG. 4B, the moment when the bit streams are generated immediately after a new transfer rate is set, the bit stream amount in each of the bit stream storage device 312 and the bit stream accumulation device 331 can be zero. Thus, the state of the encoder buffer and the decoder buffer is the same as the initial state, and the transfer rate can be changed without any malfunction.

A similar operation is performed when the transfer rate is changed from the 144 kbps to 72 kbps. In this case, the MPEG2-AAC encoder 311 is stopped for (288/144)−1(=1) frame time period (see time T6 to time T7 in FIG. 4A).

In the second example, when the transfer rate is changed, the encoding by the MPEG2-AAC encoder 311 is stopped for a prescribed number of frame time periods. Alternatively, when a transfer rate, which is different from the transfer rate at which the bit streams are input from the encoding section 31 to the transfer section 32 or the transfer rate at which the bit streams are input from the transfer section 32 to the decoding section 33, is set in the encoding section 31 by the condition setting device 34, the bit streams can be generated by the encoding section 31 to always have the maximum frame length in one frame time period immediately after the setting. In this case, the underflow in the bit stream accumulation device 331 occurs only when the transfer rate is changed, and thus the sound is prevented from being skipped during the reproduction of a program. This utilizes the fourth principle of the present invention.

Still alternatively, when a transfer rate, which is different from the transfer rate at which the bit streams are input from the encoding section 31 to the transfer section 32 or the transfer rate at which the bit streams are input from the transfer section 32 to the decoding section 33, is set in the encoding section 31 by the condition setting device 34, the decoding time immediately after the setting can be set to a value delayed by the delay amount after the transfer rate is changed. Thus, the underflow in the bit stream accumulation device 331 occurs only when the transfer rate is changed, and thus the sound is prevented from being skipped during the production of a program. This utilizes the fifth principle of the present invention.

An encoding program or decoding program for processing an audio signal in the encoding device or decoding device in the broadcasting system in each of the previous examples can be recorded on a data storage medium such as a floppy disk. In this manner, the processing described in the previous examples can be easily realized in a computer system.

Figure 5A:
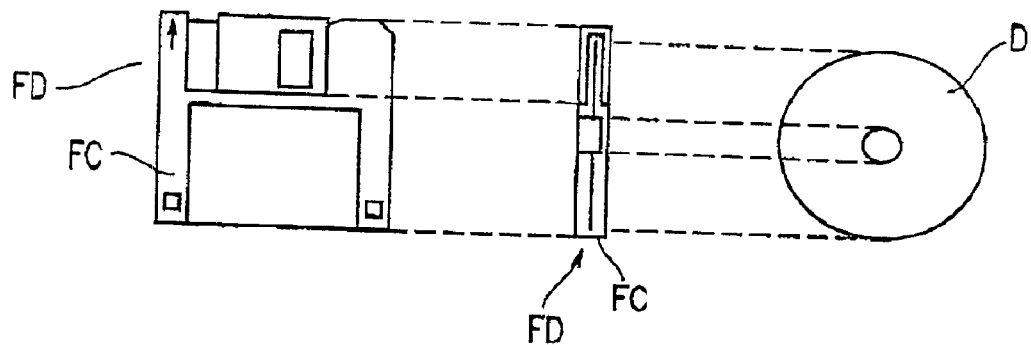
FIGS. 5A and 5B show a floppy disk having a program for performing encoding and decoding described in the first and second examples using a computer system.
Figure 5B:
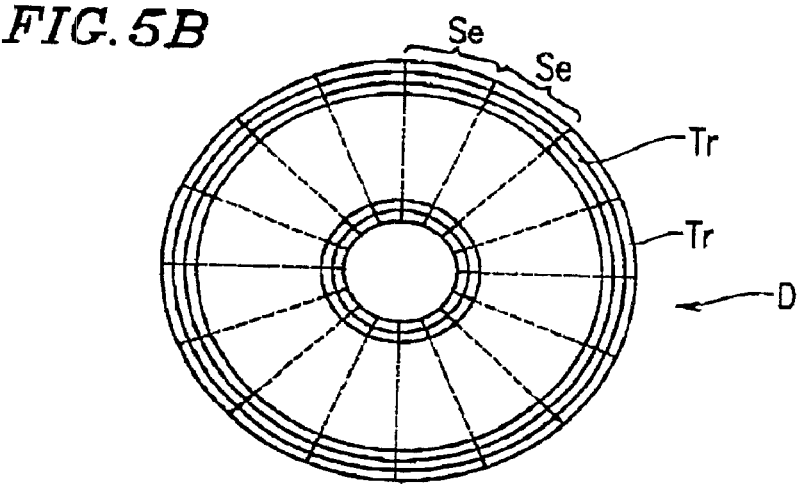

FIG. 5A shows an external view and a cross-sectional view of a floppy disk FD, and a plan view of a disk main body D of the floppy disk FD. FIG. 5B shows an exemplary physical format of the disk main body D.

As shown in FIG. 5A, the floppy disk FD includes the disk main body D accommodated in a disk case FC. As shown in FIG. 5B, a surface of the disk main body D has a plurality of concentric tracks Tr. Each of the tracks Tr is divided into 16 sections Se, each sector extending in a radial direction of the disk main body D. The above-described program is recorded on the sector Se which is assigned thereto.

Figure 5C:
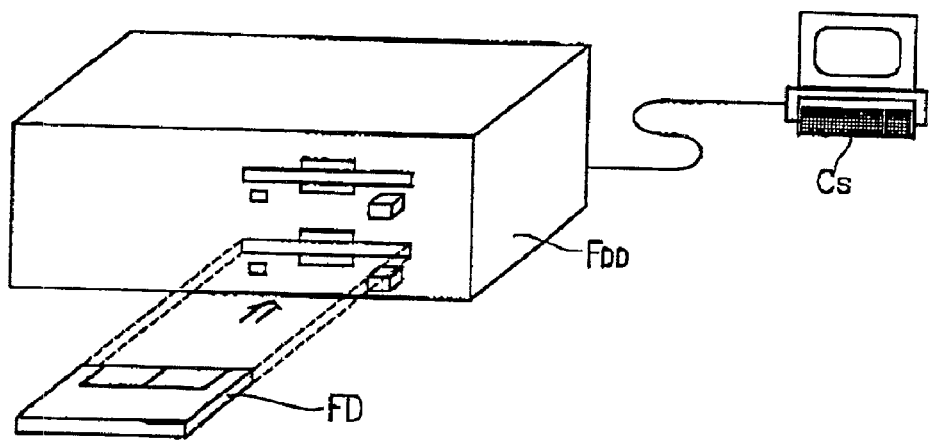
FIG. 5C shows a structure of a system for performing such encoding and decoding.

FIG. 5C shows a structure of a system for processing an audio signal performed by software using the program recorded on the floppy disk FD.

For recording the above-described program on the floppy disk FD, the data indicating the program is written into the floppy disk FD through a floppy disk drive FDD from a computer system Cs. For structuring an encoding device or decoding device in the computer system Cs by the program recorded on the floppy disk FD, the program is read from the floppy disk FD by the floppy disk drive FDD and loaded on the computer system Cs.

In the above description, the floppy disk FD is used as the data storage medium. Alternatively, an optical disk such as, for example, a CD or DVD can be used for encoding or decoding data using the software. Still alternatively, semiconductor memories such as, for example, an IC card and a ROM cassette, or any other mediums on which the program can be recorded are usable as the data storage medium for encoding or decoding.

In the case where bit streams generated from an audio signal by an encoding device in the first or second example are stored on a data storage medium such as, for example, a floppy disk and the bit streams stored in such a data storage medium are decoded to reproduce the audio signal by a decoding device in the first or second example, resetting which is conventionally performed when the transfer rate is changed can be eliminated.

EXAMPLE 3

In a third example, an operation of the broadcasting system 300 shown in FIG. 3 will be described with reference to FIG. 6. In this example, an audio signal is encoded at a transfer rate of 32 kbps and then the transfer rate is changed to 256 kbps at time T60.

FIG. 6 is a graph illustrating a change in the bit stream amount in the bit stream storage device 312 and the bit stream accumulation device 331 (FIG. 3). The following description will be conducted with reference to FIGS. 3 and 6.

Since the initial transfer rate is 32 kbps, the MPEG2-AAC encoder 311, as represented by solid line 61, generates bit streams so that the amount of bit streams stored in the bit stream storage device 312 is more than 32 kbps and 64 kbps or less and transfers the bit streams at 32 kbps in repetition.

The MPEG2-AAC encoder 311 generates the first bit streams at time T61, and the MPEG2-AAC decoder 332 starts decoding the bit streams 2 frame time periods later (i.e., time T62). Namely, the delay amount is 2. Where the transfer rate is t, the maximum amount of bit streams stored in the bit stream storage device 312 corresponds to 2×t. Therefore, the bit streams stored in the bit stream storage device 312 at a given time are all transferred 2 frame time periods later. Accordingly, when the decoding is set to start 2 frame time periods later, all the necessary bit streams are transferred without an underflow.

Then, at time T60, the transfer rate is changed to 256 kbps by the condition setting device 34. In one frame time period immediately before the transfer rate is changed to 256 kbps, the MPEG2-AAC encoder 311 generates bit streams in an amount corresponding to 32 kbps as represented by point 62. As represented by point 63, the bit stream amount stored in the bit stream storage device 312 after the final transmission performed at the transfer rate of 32 kbps is 0. Due to such a system, even when the transfer rate is changed to 256 kbps and the MPEG2-AAC encoder 311 generates bit streams so that the maximum bit stream amount stored in the bit stream storage device 312 is 288 kbps, the bit stream storage device 312 does not overflow.

In the receiver 320, while the MPEG2-AAC decoder 332 is decoding the bit streams in 2 frame time periods immediately before the transfer rate is changed to 256 kbps (time T60 and time T63), the bit stream accumulation device 331 can accumulate the bit streams received for 2 frame time periods immediately after the transfer rate is changed (time T60 to time T64). Due to such a system, the bit stream accumulation device 331 does not underflow or overflow even when the transfer rate is changed to 256 kbps. Thus, seamless processing of the bit streams is performed.

In the third example, the maximum amount of the bit streams stored in the bit stream storage device 312 is restricted, and the amount of the bit streams stored in the bit stream storage device 312 during one frame time period immediately before the transfer rate is changed is restricted. Accordingly, the bit stream storage device 312 and the bit stream accumulation device 331 are prevented from underflowing or overflowing with a smaller delay amount and a smaller capacity of the bit stream accumulation device 331 as compared with the prior art.

In the above example, the maximum amount of bit streams stored in the bit stream storage device 312 is set so that the delay amount N=2. Alternatively, the maximum amount of bit streams can be set so that the delay amount N is an arbitrary amount.

In the above example, the amount of bit streams generated in one frame time period immediately before the transfer rate is changed is restricted. In the case where the bit streams in an amount equal to or greater than the restriction amount are stored in the bit stream storage device 312, the amount of bit streams generated in a plurality of frame time periods before the transfer rate is changed can be restricted.

EXAMPLE 4

In a fourth example according to the present invention, the MPEG2-AAC encoder 311 (FIG. 3) operates in a different manner from that in the third example.

When the transfer rate is changed from a lower rate to a higher rate, the MPEG2-AAC encoder 311 generates bit streams so that the amount of the bit streams stored in the bit stream storage device 312 in one frame time period immediately after the change corresponds to the transfer rate after then change (post-change transfer rate).

When the transfer rate is changed from a higher rate to a lower rate, the MPEG2-AAC encoder 311 generates bit streams so that the amount of the bit streams stored in the bit stream storage device 312 in one frame time period immediately before the change corresponds to the transfer rate before the change (pre-change transfer rate).

An exemplary operation of the broadcasting system 300 in the case where the MPEG2-AAC encoder 311 operates in the above-mentioned manner will be described with reference to FIG. 7. In the following description, an audio signal is encoded at a transfer rate of 32 kbps and then the transfer rate is changed to 256 kbps.

Figure 7:
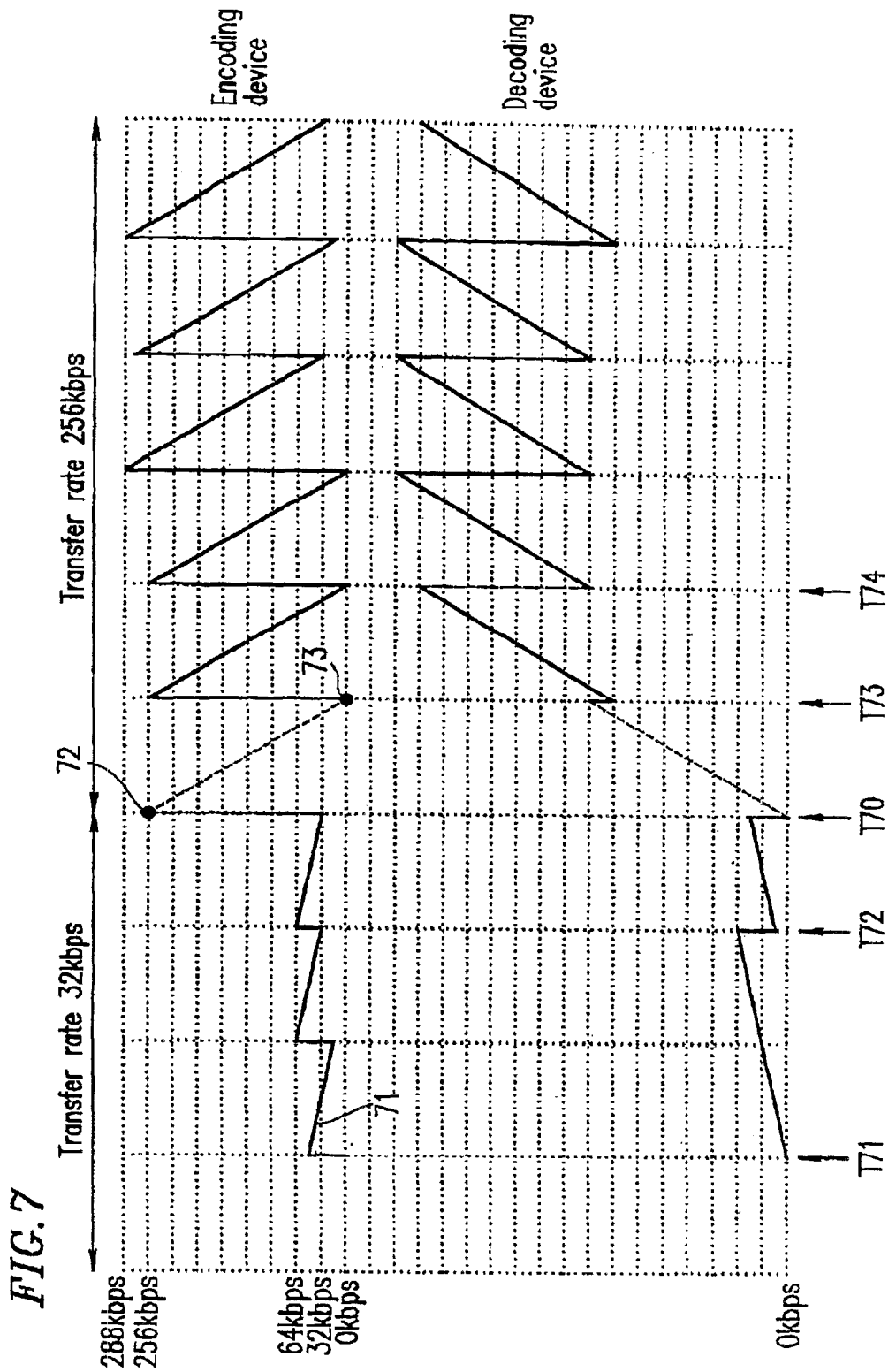
FIG. 7 is a graph illustrating an over-time change in the bit stream amount in the bit stream storage device and the bit stream accumulation device of the broadcasting system shown in FIG. 3 by an operation in a fourth example according to the present invention.

FIG. 7 is a graph illustrating a change in the bit stream amount in the bit stream storage device 312 and the bit stream accumulation device 331 (FIG. 3). The following description will be conducted with reference to FIGS. 3 and 7. The transfer rate is changed from 32 kbps to 256 kbps at time T70.

Since the initial transfer rate is 32 kbps, the MPEG2-AAC encoder 311, as represented by solid line 71, generates bit streams so that the amount of bit streams stored in the bit streams storage device 312 is more than 32 kbps and 64 kbps or less and transfers the bit streams at 32 kbps in repetition.

The MPEG2-AAC encoder 311 generates the first bit stream at time T71, and the MPEG2-AAC decoder 332 starts decoding the bit streams 2 frame time periods later (i.e., time T72). Namely, the delay amount of 2. Where the transfer rate is t, the maximum amount of bit streams stored in the bit stream storage device 312 corresponds to 2×t. Therefore, the bit streams stored in the bit stream storage device 312 at a given time are all transferred 2 frame time periods later. Accordingly, when the decoding is set to start 2 frame time periods later, all the necessary bit streams are transferred without an underflow.

Then, at time T70, the transfer rate is changed to 256 kbps by the condition setting device 34. Since the post-transfer rate is higher than the pre-transfer rate, the MPEG2-AAC encoder 311 generates bit streams in an amount corresponding to 256 kbps in one frame time period immediately after the change as represented by point 72.

As represented by point 73, the bit stream amount stored in the bit stream storage device 312 after the first transmission performed at the transfer rate of 256 kbps is 0. Due to such a system, even when the transfer rate is changed to 256 kbps and the MPEG2-AAC encoder 311 generates bit streams so that the maximum bit stream amount stored in the bit stream storage device 312 is 288 kbps, the bit stream storage device 312 does not overflow.

In the receiver 320, while the MPEG2-AAC decoder 332 is decoding the bit steams in one frame time period immediately before the change in the transfer rate and one frame time period immediately after the change in the transfer rate (time T70 and time T73), the bit stream accumulation device 331 can accumulate the bit streams received for two periods immediately after the change in the transfer rate (time T70 to time T74). Due to such a system, the bit stream accumulation device 331 does not underflow or overflow even when the transfer rate is changed to 256 kbps. Thus, seamless processing of the bit streams is performed.

Next, an exemplary operation of the broadcasting system 300 in the case where an audio signal is encoded at a transfer rate of 256 kbps and then the transfer rate is changed to 32 kbps.

Figure 8:
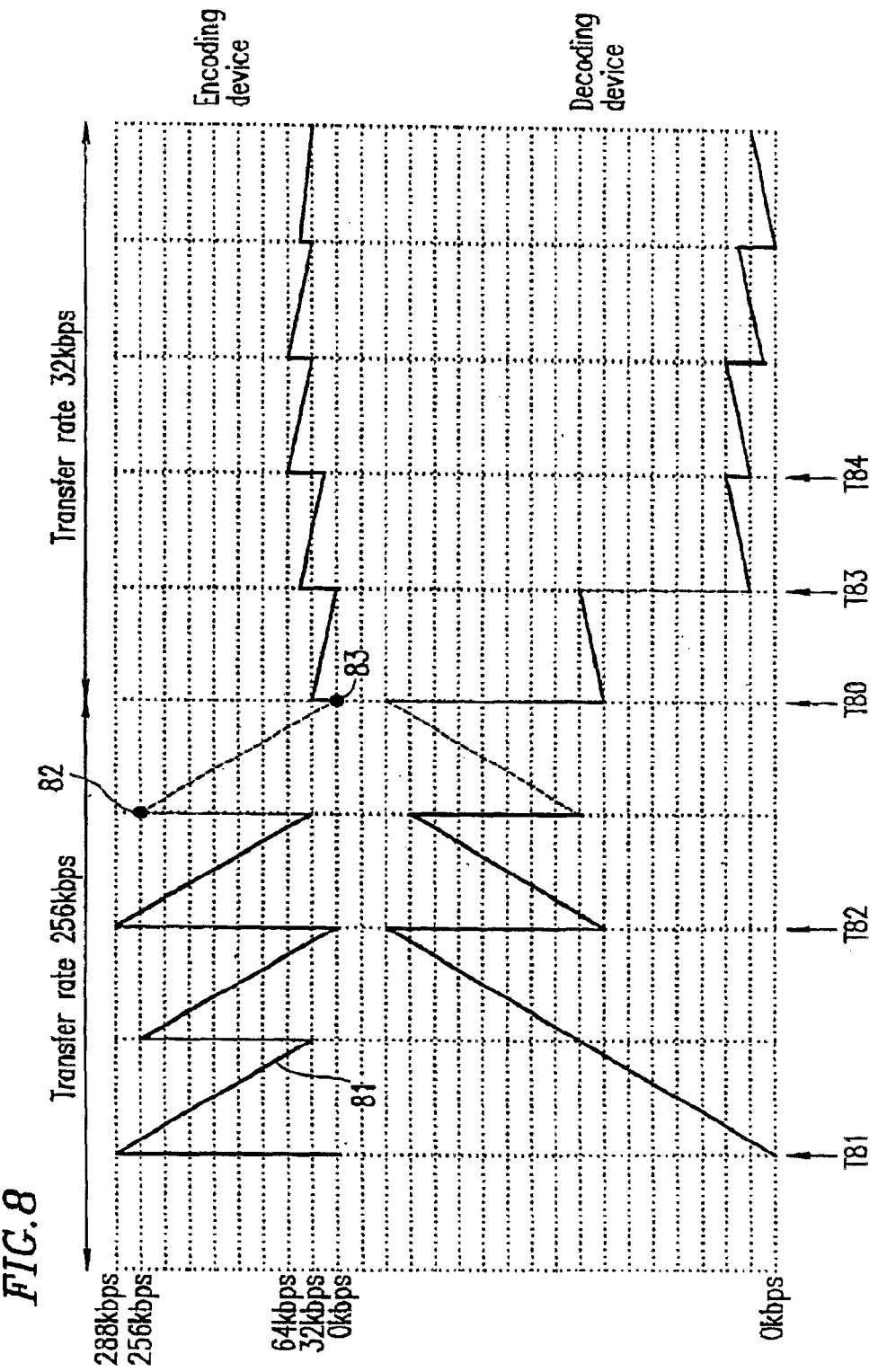
FIG. 8 is a graph illustrating an over-time change in the bit stream amount in the bit stream storage device and the bit stream accumulation device of the broadcasting system shown in FIG. 3 by another operation in the fourth example according to the present invention.
Figure 11A:
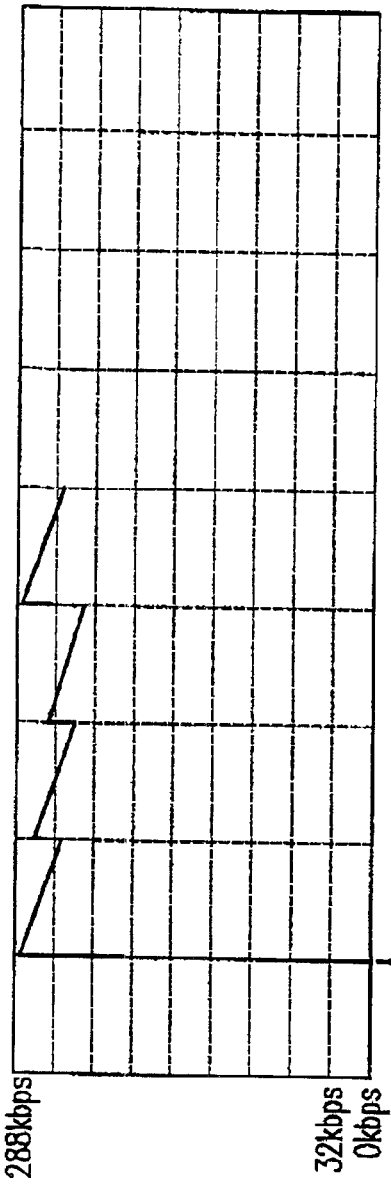
FIG. 11A is a graph illustrating an over-time change in the amount of bit streams in another conventional MPEG2-AAC encoder.
Figure 11B:
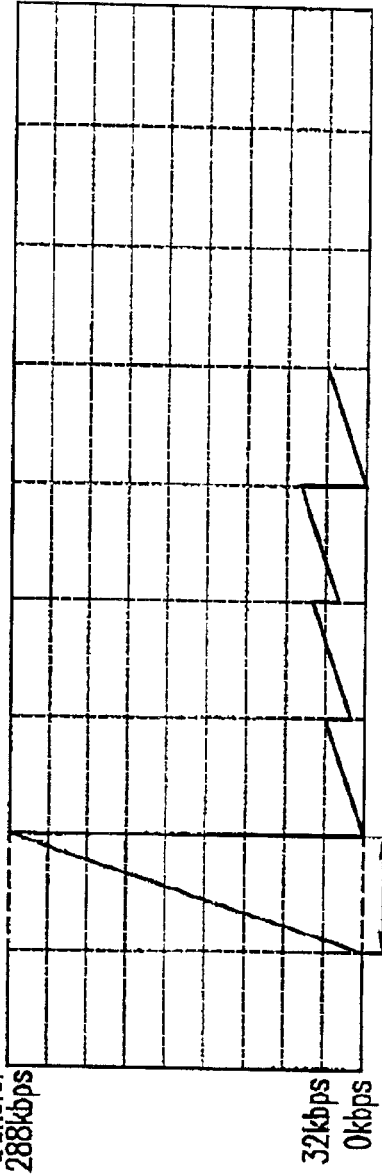
FIG. 11B is a graph illustrating an over-time change in the amount of bit streams in another conventional MPEG2-AAC decoder.

FIG. 8 is a graph illustrating a change in the bit stream amount in the bit stream storage device 312 and the bit stream accumulation device 311 (FIG. 3). The following description will be conducted with reference to FIGS. 3 and 8. The transfer rate is changed from 256 kbps to 32 kbps at time T80.

Since the initial transfer rate is 256 kbps, the MPEG2-AAC encoder 311, as represented by solid line 81, generates bit streams so that the amount of bit streams stored in the bit stream storage device 312 is more than 256 kbps and 288 kbps or less and transfers the bit streams at 256 kbps in repetition.

The MPEG2-AAC encoder 311 generates the first bit streams at time T81, and the MPEG2-AAC decoder 332 starts decoding the bit streams 2 frame time periods later (i.e., time T82). Namely, the delay amount is 2. The delay amount of 2 is preferable for the above-described reason.

Then, at time T80, the transfer rate is changed to 32 kbps by the condition setting device 34. Since the post-transfer rate is lower than the pre-transfer rate, the MPEG2-AAC encoder 311 generates bit streams in an amount corresponding to 256 kbps in one frame time period immediately before the change as represented by point 82.

As represented by point 83, the bit stream amount stored in the bit stream storage device 312 after the final transmission performed at the transfer rate of 256 kbps is 0. Due to such as system, even when the transfer rate is changed to 32 kbps and the MPEG2-AAC encoder 311 generates bit streams so that the maximum bit stream amount stored in the bit stream storage device 312 is 64 kbps, the bit stream storage device 312 does not overflow.

In the receiver 320, while the MPEG2-AAC decoder 332 is decoding the bit streams in 2 frame time periods immediately before the change in the transfer rate (time T80 and time T83), the bit stream accumulation device 331 can accumulate the bit streams received for the 2 frame time periods immediately after the change in the transfer rate (time T80 to time T84). Due to such a system, the bit stream accumulation device 331 doe not underflow or overflow even when the transfer rate is changed to 32 kbps. Thus, seamless processing of the bit streams is performed.

In the fourth example, the maximum amount of the bit streams stored in the bit stream storage device 312 is restricted. Furthermore, the amount of the bit streams stored in the bit stream storage device 312 in one frame time period immediately before or immediately after the transfer rate is changed to restricted in accordance with whether the pre-transfer rate is higher or lower than the post-transfer rate. Accordingly, the bit stream storage device 312 and the bit stream accumulation device 331 are prevented from underflowing or overflowing, with a smaller delay amount and a smaller capacity of the bit stream accumulation device 331 as compared with the prior art. Moreover, since more bits can be assigned to one frame time period as compared to the third example, a higher sound quality can be maintained at the time of change in the transfer rate.

In the above example, the maximum amount of bit streams stored in the bit stream storage device 312 is set so that the delay amount N=2. Alternatively, the maximum amount of bit streams can be set so that the delay amount N is an arbitrary amount.

In the example shown in FIG. 7, the amount of bit streams generated in the frame immediately after the transfer rate is changed is restricted. In the case where the bit streams in an amount equal to or greater than the restriction amount are stored in the bit stream storage device 312, the amount of bit streams generated in a plurality of frame time periods immediately after the transfer rate is changed can be restricted.

In the example shown in FIG. 8, the amount of bit streams generated in the frame immediately before the transfer rate is changed is restricted. In the case where the bit streams in an amount equal to or more than the restriction amount are stored in the bit stream storage device 312, the amount of bit streams generated in a plurality of frame time periods immediately before the transfer rate is changed can be restricted.

In the third and fourth examples, the transmitter 310 (FIG. 3) can further include the decoding time information desig-nation device 35 for adding decoding time information to the bit streams in one frame time period immediately after the transfer rate is changed. The decoding time designation information is obtained by adding a value of time when transfer of the bit streams is restarted and a value of at least a time period in which the bit streams of the maximum frame length transferred at the post-change transfer rate are to be accumulated in the bit stream accumulation section. The decoding time information is used for determining a time period in which the bit streams provided with the time information are to be accumulated in the bit stream accumulation device 331 in the receiver 320. By such determination, the delay amount elapsed between the generation of the bit streams by the MPEG2-AAC encoder 311 and the decoding of the bit streams by the MPEG2-AAC decoder 332 can be defined.

In the first through fifth examples, the broadcasting systems including the transmitter and the receiver are described. The present invention is applicable to a system including the transmitter or the receiver according to the present invention and a conventional device.

The bit streams produced by the MPEG2-AAC encoder according to the present invention can be recorded on any recording medium such as, for example, a CD, DVD, or a semiconductor memory. The bit streams recorded on such a recording medium is reproduced by a reproduction apparatus and decoded by the MPEG2-AAC decoder according to the present invention into the original audio signal.

According to the present invention, an encoding device and a decoding device have a buffer for storing a sufficient amount of data, so that a maximum possible delay amount is available from the generation of the bit streams until the consumption thereof. Therefore, encoding the decoding can be performed without changing the delay amount even when the transfer rate is changed. Thus, the transfer rate can be changed without resetting.

According to the present invention, an encoding device has a buffer for storing a sufficient amount of data, so that a maximum possible delay amount is available from the generation of the bit streams until the consumption thereof. Moreover, the amount of the bit streams generated in the encoding device is controlled. Therefore, encoding and decoding can be performed without requiring the buffer capacity to be increased and thus without changing the delay amount even when the transfer rate is changed. Thus, the transfer rate can be changed without resetting.

According to the present invention, the operation of the encoding device when the transfer rate is changed is controlled. Therefore, the transfer rate can be changed without resetting, simply by providing an encoding device or a decoding device with a buffer for storing the bit streams in an amount corresponding to the maximum frame length.

According to the present invention, the manner of generating the bit streams in the encoding device when the transfer rate is changed is controlled. Since a silent portion exists only when the transfer rate is changed, generation of the silent portion during the reproduction of a program can be prevented.

According to the present invention, decoding time designation information is inserted into the bit streams. Since the decoding time of the bit streams by the decoding device can be designated, a silent portion exists only when the transfer rate is changed. Thus, generation of a silent portion during the reproduction of a program can be prevented.

According to the encoding and decoding devices of the present invention, the transfer rate can be changed seamlessly without any underflow or overflow of the buffers, with a smaller delay amount and a smaller buffer capacity as compared to the prior art.

The present invention provides a high sound quality even when the transfer rate is being changed in addition to seamless data transfer and prevention of underflow or overflow of the buffers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A decoding device for converting bit streams produced by an encoding device into an audio signal, the decoding device comprising:

a bit stream accumulation section for accumulating the bit streams; and a decoding section for decoding the bit streams accumulated in the bit stream accumulation section, wherein:

the bit stream accumulation section includes a buffer having a capacity corresponding to at least a value which is obtained by multiplying the maximum frame length of the bit streams with a value obtained by dividing a maximum possible transfer rate by a minimum possible transfer rate, and the decoding section starts decoding the bit streams after accumulating, in the bit stream accumulation section, the bit streams for a time period of a value obtained by multiplying one frame time period with a value obtained by dividing the maximum possible transfer rate by the minimum possible transfer rate.

2. A broadcasting system including a transmitter for encoding an audio signal into bit streams and transmitting the bit streams, and a receiver for receiving the bit streams and decoding the bit streams into the audio signal, wherein the audio signal is decoded by the decoding device according to claim 1.

3. A broadcasting system including an encoding device and a decoding device, wherein:

the encoding device includes:

an encoding section for generating bit streams having a variable frame length from an input audio signal, a maximum frame length of the bit streams being fixed;

a storage section for storing the bit streams generated by the encoding section; and a transfer section for transferring the bit streams from the storage section at a changeable transfer rate, wherein the storage section includes a buffer having a capacity corresponding to at least a value which is obtained by subtracting an amount of the bit streams transferable in one frame time period at a minimum possible transfer rate from a value of twice the maximum frame length, and the decoding device includes:

a bit stream accumulation section for accumulating the bit streams; and a decoding section for decoding the bit streams accumulated in the bit stream accumulation section, wherein:

the bit stream accumulation section includes a buffer having a capacity corresponding to at least a value which is obtained by multiplying the maximum frame length of the bit streams with a value obtained by dividing a maximum possible transfer rate by a minimum possible transfer rate, and the decoding section starts decoding the bit streams after accumulating the bit streams for a time period of a value obtained by multiplying one frame time period with a value obtained by dividing the maximum possible transfer rate by the minimum possible transfer rate.

* * * * *